C. C. CARPENTER.
TERMINAL MEANS FOR BATTERY PLATES.
APPLICATION FILED AUG. 13, 1917.

1,336,127. Patented Apr. 6, 1920.

WITNESS:
Fay E Bronk.
Ralph Munden

INVENTOR.
Campbell C. Carpenter.
BY Raymond H Van Vleet.
ATTORNEY.

UNITED STATES PATENT OFFICE.

CAMPBELL C. CARPENTER, OF NIAGARA FALLS, NEW YORK, ASSIGNOR TO U. S. LIGHT & HEAT CORPORATION, OF NIAGARA FALLS, NEW YORK, A CORPORATION OF NEW YORK.

TERMINAL MEANS FOR BATTERY-PLATES.

1,336,127.   Specification of Letters Patent.   Patented Apr. 6, 1920.

Application filed August 13, 1917. Serial No. 185,854.

*To all whom it may concern:*

Be it known that I, CAMPBELL C. CARPENTER, a citizen of the United States, residing at Niagara Falls, in the county of Niagara and State of New York, have invented new and useful Improvements in Terminal Means for Battery-Plates, of which the following is a specification.

The present invention relates to terminal means for battery plates.

Difficulty has been experienced in some cases in storage battery practice, due to the fact that the ordinary terminal straps which are used to mechanically and electrically connect storage battery plates of like polarity in a cell do not provide a sturdy construction. This difficulty has been encountered particularly in cases where heavy storage battery plates are used.

The present invention relates to improved means for connecting the straps to the plates which will provide a construction well adapted to withstand the shocks encountered in practice.

An object is to provide a terminal construction which is sturdy and which may be assembled at a minimum of expense.

Further objects will be apparent as the description proceeds.

Referring to the drawings, Figure 1 represents a storage battery plate with a part broken away showing terminal lugs before the strap is applied thereto.

Figure 1:
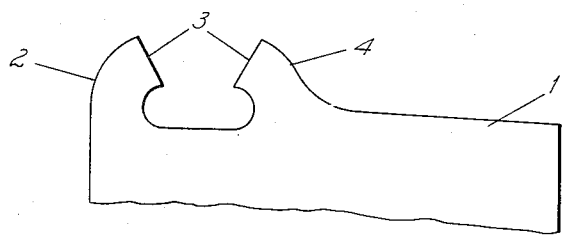

The numeral 1 indicates a storage battery plate. This plate is provided with a pair of terminal lugs 2, 2, arranged upon the upper edge of said plate. These lugs 2, 2, extend upwardly and toward one another and will preferably have their upper edges arranged at an angle to one another as indicated by the numerals 3, 3, in Fig. 1.

Figure 2:
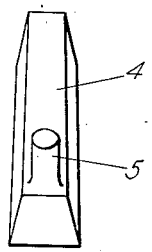
Fig. 2 represents in perspective a strap according to the present invention.

Fig. 2 represents a strap 4 according to the present invention. Said strap 4 may be of a length necessary to connect all the plates of like polarity in a cell and will preferably be trapezoidal in cross-section. A terminal post 5 will be integrally united with said strap 4.

Figure 3:
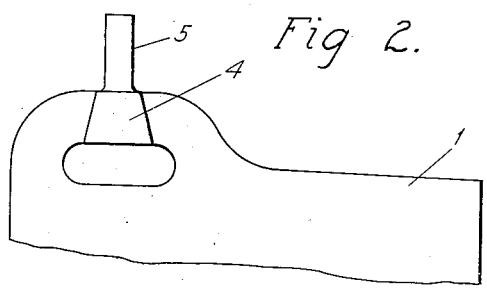
Fig. 3 represents a side view of a battery plate with the strap applied thereto.
Figure 4:
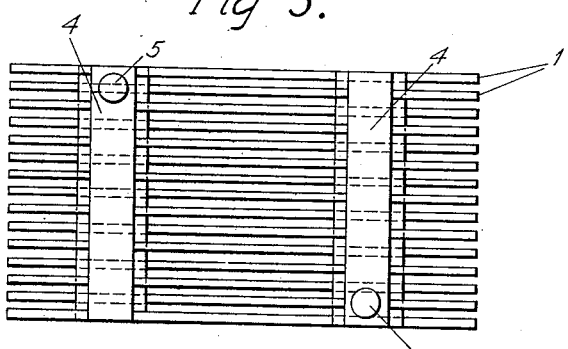
Fig. 4 represents in top plan a view of the two straps of a storage battery cell with the plates attached thereto.

In assembling the plates of like polarity to the strap 4, said plates may be arranged in a group in a mold. The strap 4 will be held in proper position and a burning flame will be applied to the sides of the strap and to the edges 3, 3, of the terminal lugs of the plates. Sufficient metal will be added to fill up the spaces between the terminal lugs and the strap, whereby the plates and strap will be integrally united, having the conformation illustrated in Figs. 3 and 4.

It will be apparent that the present invention affords a sturdy construction and one which may be assembled at a minimum of expense.

One embodiment of the present invention has been described in detail. Many modifications will occur to those skilled in the art. It is intended that this patent shall cover all such modifications that come within the scope of the invention as defined by the appended claims.

What I claim as new and desire to secure by Letters Patent of the United States, is—

1. A battery plate having a pair of terminal lugs extending from the upper edge of said plate and a terminal strap extending normally of said plate, said lugs being integrally united to the sides of said strap.

2. A battery plate having a pair of terminal lugs extending upwardly therefrom, said lugs extending toward one another, and a terminal strap integrally united to said lugs.

3. A battery plate having a pair of terminal lugs extending upwardly therefrom, and a strap, said strap and said lugs being so shaped that when assembled they provide a pair of substantially V-shaped notches, whereby said strap and said lugs may be readily united.

4. In combination, a terminal strap and a battery plate having lugs straddling said strap, said strap and said lugs being integrally united.

5. The method of joining a terminal strap to a battery plate which consists of providing said plate with lugs adapted to straddle said strap to provide V-shaped notches on either side of said strap and filling up said notches with molten material to provide an integral structure.

In witness whereof I have hereunto subscribed my name.

CAMPBELL C. CARPENTER.